(12) United States Patent
Saha et al.

(10) Patent No.: US 7,870,545 B2
(45) Date of Patent: Jan. 11, 2011

(54) PROTECTING SHARED VARIABLES IN A SOFTWARE TRANSACTIONAL MEMORY SYSTEM

(75) Inventors: Bratin Saha, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1352 days.

(21) Appl. No.: 11/305,634

(22) Filed: Dec. 16, 2005

(65) Prior Publication Data

US 2007/0156780 A1 Jul. 5, 2007

(51) Int. Cl.
  *G06F 12/00* (2006.01)
  *G06F 13/00* (2006.01)
  *G06F 13/28* (2006.01)
  *G06F 9/45* (2006.01)
  *G06F 9/46* (2006.01)

(52) U.S. Cl. .................. 717/159; 711/147; 711/150; 717/154; 718/107

(58) Field of Classification Search ............ 717/140, 717/216, 218; 712/216, 218; 718/100, 102, 718/106, 107
See application file for complete search history.

(56) References Cited

U.S. PATENT DOCUMENTS

| 5,428,761 | A * | 6/1995 | Herlihy et al. | 711/130 |
|---|---|---|---|---|
| 5,613,121 | A * | 3/1997 | Blainey | 717/151 |
| 7,395,382 | B1 * | 7/2008 | Moir | 711/147 |
| 2002/0073401 | A1 * | 6/2002 | Sangavarapu et al. | 717/129 |
| 2002/0169935 | A1 * | 11/2002 | Krick et al. | 711/167 |

FOREIGN PATENT DOCUMENTS

WO   2007/078571 A1   7/2007

OTHER PUBLICATIONS

Harris, Oct. 2003, ACM, pp. 388-402.*
Moir M: "Hybird Transactional Memory" Announcement Sun Microsystems, XX, XX, Jul. 2005, pp. 1-15, XP002407375.
Moir M: "Hybird Hardware/Software Transactional Memory" Internet Citation, [Online] Apr. 8, 2005, XP002407376 Retrieved from the Internet: URL:http://www.cs.wisc.edu/{rajwar/tm-workshop/Talks/moir.pdf> [retrieved on Nov. 14, 2006].
Rajwar R et al.: "Virtualizing Transactional Memory" Computer Architecture, 2005. ISCA '05. Proceedings. $32^{nd}$ International Symposium on Madison, WI, USA Jun. 4-8 2005, Piscataway, NJ, USA, IEEE, Jun. 4 2005, pp. 1-12, XP010807930.

(Continued)

*Primary Examiner*—Tuan Q Dam
*Assistant Examiner*—Jonathan R Labud
(74) *Attorney, Agent, or Firm*—Caven & Aghevli LLC (57) ABSTRACT

For a variable accessed at least once in a software-based transactional memory system (STM) defined (STM-defined) critical region of a program, modifying an access to the variable that occurs outside any STM-defined critical region system by starting a hardware based transactional memory based transaction, within the hardware based transactional memory based transaction, checking if the variable is currently owned by a STM transaction, checking if the variable is currently owned by a STM transaction; if the variable is not currently owned by a STM transaction, performing the access and then committing the hardware based transactional memory transaction; and if the variable is currently owned by a STM transaction, performing a responsive action.

24 Claims, 3 Drawing Sheets

OTHER PUBLICATIONS

Lev Y et al.: "Towards a Safer Interaction with Transactional Memory by Tracking Object Visibility", Proceedings of Synchronization and Concurrency in Object-Oriented Languages (SCOOL), OOPSLA 2005 Workshop, [Online]Oct. 7, 2005, pp. 31-38, XP002432120.

PCT, International Search Report and Witten Opinion of the International Searching Authority, Application No. PCT/US2006/046775 date of mailing Jun. 12, 2007.

Harris et al., "Language Support for Lightweight Transactions"., University of Cambridge Computer Laboratory; 15 pages.

* cited by examiner

PROTECTING SHARED VARIABLES IN A SOFTWARE TRANSACTIONAL MEMORY SYSTEM

RELATED APPLICATIONS

The present application is related to pending U.S. patent application Ser. No. 11/304,509 entitled "LOCK ELISION WITH TRANSACTIONAL MEMORY;", and assigned to the assignee of the present invention.

BACKGROUND

Transactional support in hardware for lock-free shared data structures using transactional memory is described in M. Herlihy and J. Moss, *Transactional memory: Architectural support for lock-free data structures*, Proceedings of the 20$^{th}$ Annual International Symposium on Computer Architecture 20, 1993 (Herlihy and Moss). This approach describes a set of extensions to existing multiprocessor cache coherence protocols that enable such lock free access. Transactions using a transactional memory are referred to as transactional memory transactions or lock free transactions herein.

DETAILED DESCRIPTION

Figure 1:
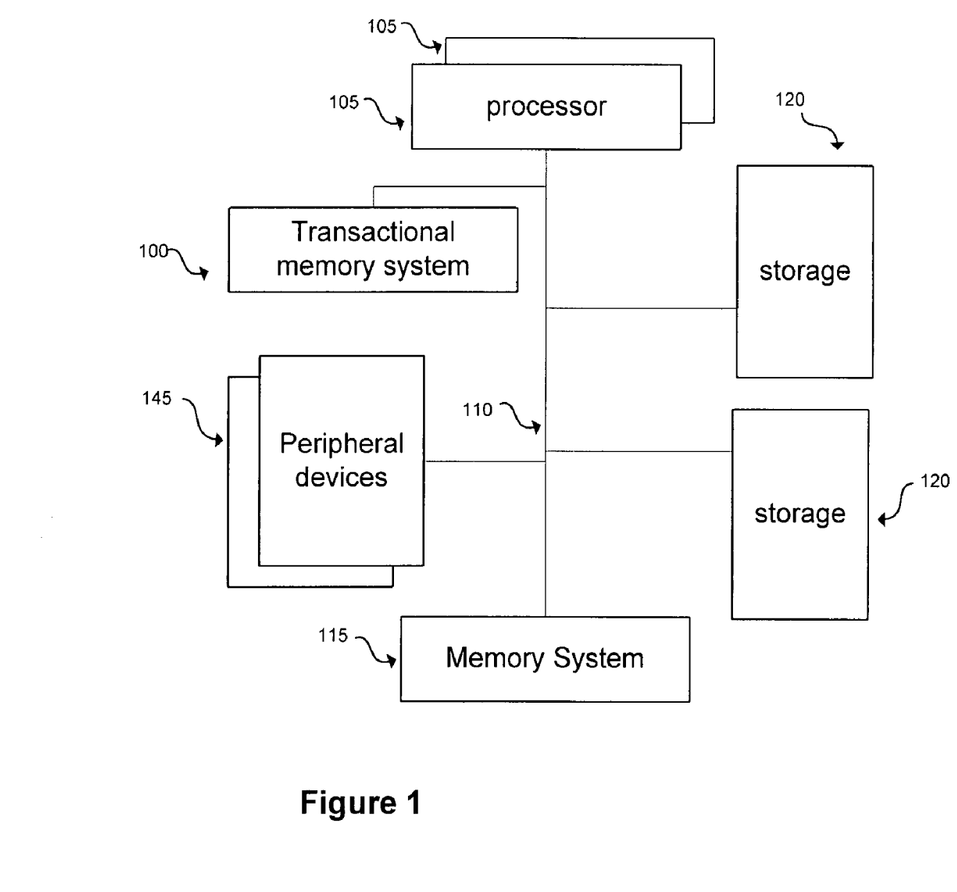
FIG. 1 depicts a processor based system in one embodiment.

Referring to FIG. 1, a processor based system as shown may include one or more processors 105 coupled to a bus 110. Alternatively the system may have a processor that is a multi-core processor, or in other instances, multiple multi-core processors. In some embodiments the processor may be hyper-threaded, or able to perform in a manner as if it were a multi-core processor despite having only a single core. In a simple example, the bus 110 may be coupled to system memory 115, storage devices such as disk drives or other storage devices 120, peripheral devices 145. The storage 120 may store various software or data. The system may be connected to a variety of peripheral devices 145 via one or more bus systems. Such peripheral devices may include displays and printing systems among many others as is known.

In one embodiment, a processor system such as that depicted in the figure adds a transactional memory system 100 that allows for the execution of lock free transactions with shared data structures cached in the transactional memory system, as described in Herlihy and Moss. The processor(s) 105 may then include an instruction set architecture that supports such lock free or transactional memory based transactions. In such an architecture, the system in this embodiment supports a set of instructions, including an instruction to begin a transaction; an instruction to terminate a transaction normally; and an instruction to abort a transaction.

The system of FIG. 1 is only an example and the present invention is not limited to any particular architecture. Variations on the specific components of the systems of other architectures may include the inclusion of transactional memory as a component of a processor or processors of the system in some instances; in others, it may be a separate component on a bus connected to the processor. In other embodiments, the system may have additional instructions to manage lock free transactions. The actual form or format of the instructions in other embodiments may vary. Additional memory or storage components may be present. A large number of other variations are possible.

Software transactional memory systems (STM systems) are known in the art. For clarity and concreteness in describing embodiments, a specific simple implementation of software transactional memory is provided below. This description is based extensively on *Language Support For Lightweight Transactions*, Tim Harris and Keir Fraser, in *Proceedings of OOPSLA* 2003 (Harris style STM). The Harris style STM system provides runtime support in software for basic transactions such as those implemented by a well-known concurrency control protocol: conditional critical regions (CCRs). As is known in the art, CCRs have the general form

```
atomic (condition) {
    statements;
}
``` which defines a CCR that waits if necessary until condition is true and then executes statements. To implement the basic functionality of a CCR, the Harris style STM provides the following primitives:

```
STMStart ( ); STMRead(&x); STMWrite(&y, value); STMCommit.
```

Using these primitives, a STM may be used to implement an atomic statement written in source code language as in the following atomic increment example:

```
atomic {
    y = x + 1;
}
```

The above would be replaced by the following underlying code following compilation:

```
boolean done = false;
while (!done) {
    STMStart ( );
    try {
        temp = stmRead(&x);
        stmWrite(&y, temp + 1);
        done = STMCommit ( );
    } catch (Throwable t) {
        done = STMCommit ( );
        if (done) {
            throw t;
        }
    }
}
```

The code segment above implements an STM-defined critical section version of the atomic increment listed using pseudocode. The STMstart call creates a software-based transaction within which the process attempts to read the value of x and write the value of x+1 into variable y atomically. When the transaction succeeds, a commit (STMCommit) is performed thereby closing the critical section. Even if an error does occur, for example, if the try section fails because a data conflict is detected, the transaction is closed out and the atomic increment is retried: the entire process is enclosed in a while loop in the standard manner to repeatedly attempt the access until a successful commit is achieved, thereby setting the variable done to true.

Figure 2:
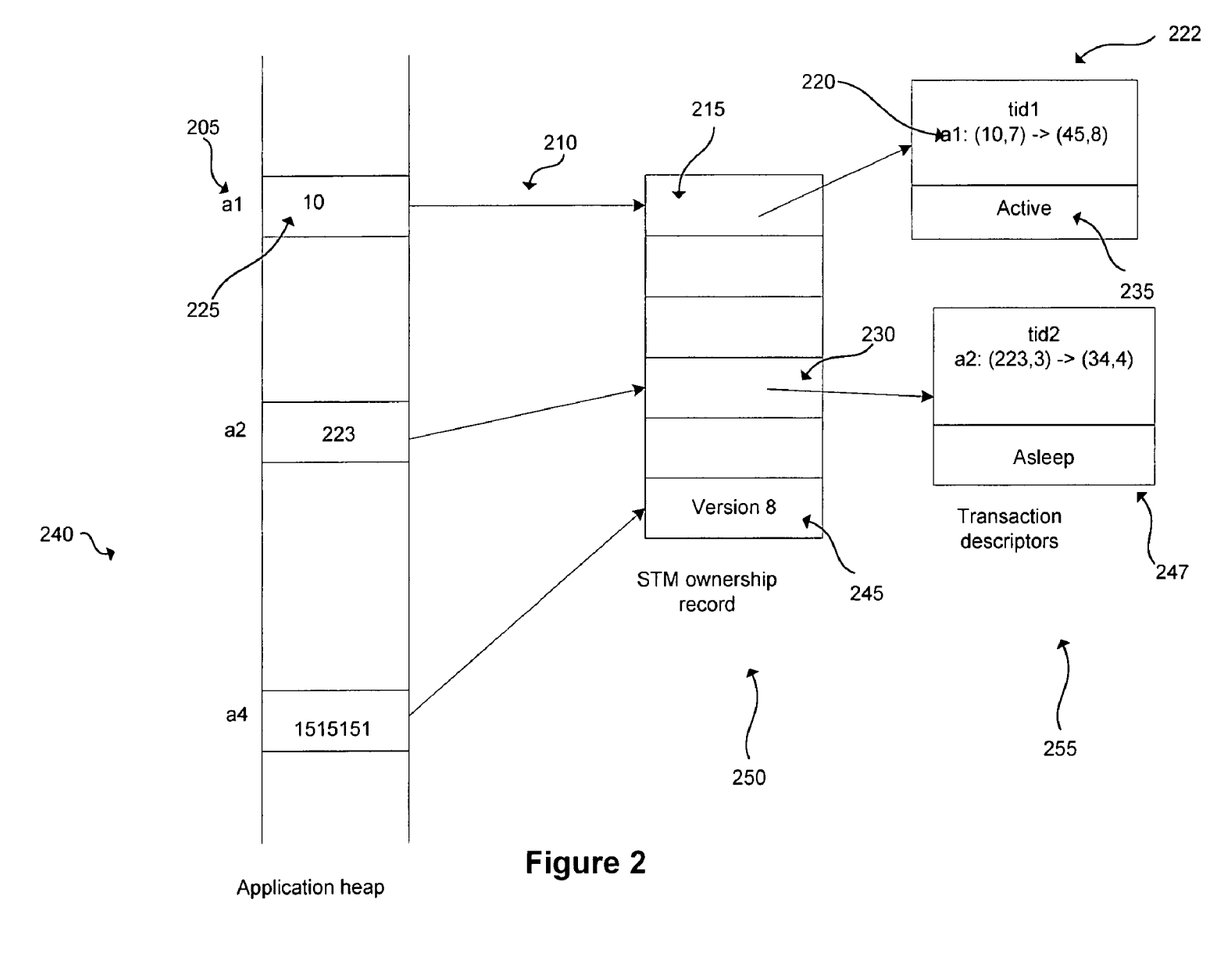
FIG. 2 depicts an implementation of a Software Transactional Memory System.

To implement the functionality provided by the primitives of the Harris style STM, the implementation described in the above referenced paper uses three types of data structures, as indicated in FIG. 2. The first data structure is the application heap 240 in which the data itself is held. The application heap maps addresses such as address a1 at 205, to values stored in the heap such as the value 10 stored at 225. The second kind of structure is the set of ownership records 250 which are used to co-ordinate transactions. An ownership function such as a hashing function 210 maps each address in the application heap to an associated ownership record indicating which transaction owns the variable associated with that address at the present time. For example, the variable at 225 is matched to an ownership record at 215 via the mapping 210. There need not be a one-to-one correspondence between addresses and records. Each ownership record in the structure 250 holds either a version number or a current owner for the addresses that associate with it, for example, the record 245 is associated with the variable at address a4 and includes its version number which is 8. Each time a location in the application heap is updated, the version number must be incremented. Version numbers are used to detect whether a transaction may be committed. The record at 230 is associated with the variable at address a2, which is part of an active transaction. The record references a transaction descriptor which includes accesses to the variable a2. The third kind of structure at 255 holds transaction descriptors which set out the current status of each active transaction and the accesses that it has made to the application heap. Each access is described by a transaction entry specifying the address in question, the old and new values to be held there, and the old and new version numbers of those values. The status field indicates that the transaction is either ACTIVE (able to have STMAbort, STMWait, STMCommit, STMRead and STMWrite operations invoked for it), COMMITTED, ABORTED or ASLEEP. Descriptors are initially ACTIVE and move through the other states while attempting to commit, to abort or to wait. Thus for example the transaction descriptor associated with the variable a1 at 222 indicates that the status of that transaction which is identified by identifier tid1, is ACTIVE based on the value of field 235. The transaction descriptor also indicates at 220 that the transaction is attempting to change the value of the variable at a1 from 10 to 45 and to change its version number from 7 to 8. Similarly the transaction descriptor associated with transaction variable a2 at a 247 indicates that the variable is about to be updated from the value to 223 to the value 34 and its version number incremented from the value 3 to the value 4. However this transaction descriptor indicates that the transaction tid2 corresponding to descriptor 247 is not active as its status is ASLEEP.

At run time, the logical state of a variable at an address can be determined from a consistent snapshot of the locations on which its value depends: the address itself, its ownership record, and the status of an owning descriptor and information from entries in that descriptor. A process can directly compute the logical state by reading the relevant fields in the data structures described above.

While further details of the implementation of the primitives of the Harris style STM may be found in the paper referenced above, it should be clear from the preceding outline to one in the art that because all of the operations required to maintain and implement the various data structures occur in software, several operations and many memory references are required in order to implement an atomic transaction using an STM. This characteristic is also likely to be found in most other types of STMs and most other implementations of STMs.

When using multi-threaded code that relies on an underlying STM to achieve atomicity, correctness, and critical sections, it is possible, for example, through inadvertent programmer error, that a variable that is being used atomically in one portion of the code is referenced outside a critical section in another portion of the code. This may cause problems if a thread with an unprotected reference to the shared variable executes concurrently with a thread where the shared variable is referenced in a critical section, due to unexpected data conflicts that may occur and may even remain undetected despite the programmer's expectation that the variable will be atomically accessed.

A simplistic solution to this problem is to have a compiler insert an STM based critical section around any access to a shared variable that is found in an unprotected section of the code. However as explained above, because of the overhead involved in doing so, this may prove prohibitively expensive in terms of performance.

In one embodiment it is possible to prevent errors occurring due to variables accessed atomically using underlying STM functionality, and also accessed in an unprotected manner outside atomic regions, and by augmenting the runtime implementation of the software transactional system with functionality from a hardware-based transactional memory system. In this hybrid embodiment, errors caused by inadvertent access to protected shared variables outside critical sections of code would be detectable, in general, without incurring the same level of performance penalty that would be required in order to implement such protection in a purely STM based system.

Figure 3:
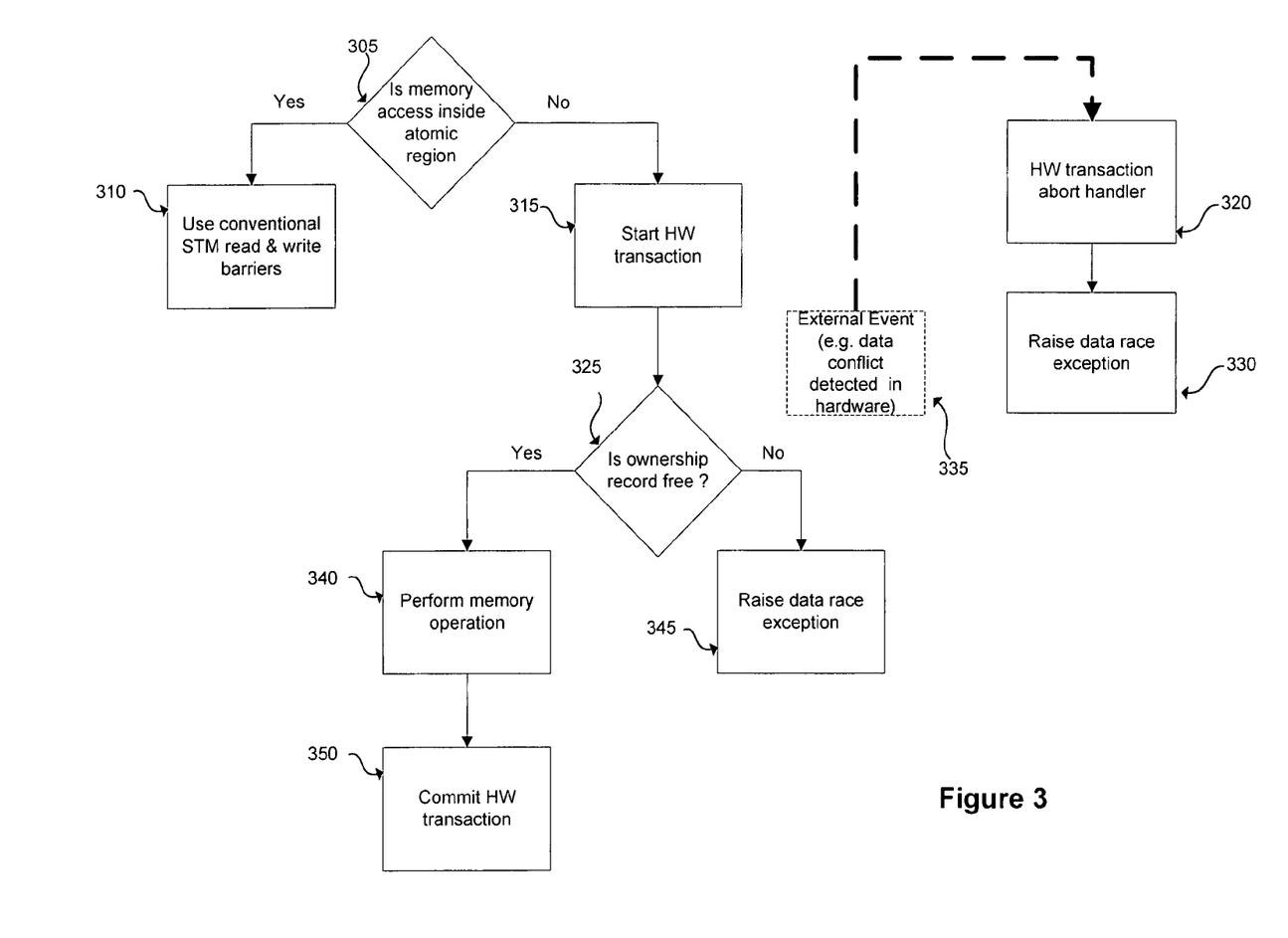
FIG. 3 depicts processing in one embodiment.

At a high level, FIG. 3 shows the processing used in one embodiment to achieve such protection. In the embodiment, a compiler processes STM based code, and modifies each unprotected access to a shared variable. The compiler may use various static or dynamic algorithms to detect shared variables. The execution of the modified code following this processing, at runtime, is shown in the figure. First the system checks if the memory access is actually inside an STM defined critical section at 305. If it is, a hardware transaction is not necessary, and execution continues at 310 by using conventional STM read and write barriers. If however the memory access is not inside an STM defined critical section or atomic region, the process starts a hardware transaction at 315. Within this hardware transaction, at 325, the process checks the ownership record for the variable whose access is being protected. If the ownership record is free this means that no other transaction owns this particular memory address. Therefore the hardware-based transaction may perform the requested memory operation at 340, and then commit the transaction at 350. If on the other hand the ownership record is not free it means that another transaction is accessing the same memory location, thereby producing a potential data race. The process then raises an exception at 345. Alternative embodiments are possible wherein the process may decide to wait for the ownership record to be free before restarting at block 305.

Furthermore, at any point after the check at 325, if another process creates a possible data conflict by accessing any of the memory locations within the hardware transaction such as the ownership record or the variable itself, then an interrupt event is generated in hardware at 335. The abort handler for the transaction then takes over at 320 and aborts the transaction with the data race exception at 330. Alternative embodiments are possible, for example the abort handler may cause the memory operation to be retried by restarting execution at block 305.

Thus all potential previously undetectable data races which may have occurred because of unprotected accesses to shared variables in a STM system are now protected in each case. Furthermore because of the relative efficiency of the hardware-based transaction system, as compared to an STM in general, this protection is achieved with a relatively low performance overhead.

TABLE 1 load addr

| | |
|---|---|
| 1 | start HW transaction |
| 2 | If (ownership_record(addr) == NULL) { |
| 3 |   temp = *addr; |
| 4 |   commit HW transaction; |
| 5 |   return temp; |
| 6 | } |
| 7 | commit HW transaction; /* if we get here implies data race */ |
| 8 | raise data_race exception; | store addr, value

| | |
|---|---|
| 9 | start HW transaction |
| 10 | If (ownership_record(addr) == NULL) { |
| 11 |   *addr = value; |
| 12 |   commit HW transaction; |
| 13 |   return; |
| 14 | } |
| 15 | commit HW transaction; /* if we get here implies data race */ |
| 16 | raise data_race exception; |

Table 1 lists pseudocode in an embodiment used to protect accesses to shared variables occurring outside STM defined critical sections. The pseudocode used to replace a load instruction (i.e a read operation) referencing such a shared variable is presented at lines 1 through 8. This pseudocode corresponds to the processing flow earlier described with reference to FIG. 3, specifically, the path 315, and either 325, 340, 350 or, 325, 345. After starting the hardware transaction at line 1 in table 1 the process first checks if the ownership record associated with the address for the shared variable is free at line 2. If the ownership record is not free, then the check at line 2 will fail. The code then executes a commit to close out the hardware transaction at line 7 and raises a data race exception at line 8. If however, the ownership record is free at line 2, then the load may proceed and lines 3 and 4 complete the load, commit the transaction, and the process returns at line 5 with the value of the variable.

The corresponding code for a store of a value (corresponding to a write operation) to a variable and lines 9-16 is identical to that used earlier in the case of the load except for lines 11 and 13. At line 11 the store is accomplished by storing the provided value at the address of the variable; and the return at line 13 is unaccompanied by a value, unlike the load, because no value is returned by the store operation.

It should be noted that the above is a description of only one embodiment. In general many different types of software transactional memory systems are available and are known in the art. The protection of access to shared variables occurring outside software transactional memory sections described above only relies on there being some implementation of an ownership record associated with the variable. It should be noted that the other particulars of the Harris style STM are only provided for concreteness and clarity of presentation. In other embodiments many variations of the processing flow depicted in FIG. 3 and the corresponding code as depicted in table 1 may be present. For one example, the exact procedure calls used to control the hardware transaction system may vary. Similarly access to the ownership record for a variable will depend on the exact syntax required for a specific STM. For clarity the details of an abort handler are not presented in the figure or the table but will be apparent to one in the art. Furthermore, as should be clear to one in the art, the tables above are merely exemplary code fragments in one embodiment. In other embodiments, the implementation language may be another language, e.g. C or Java; the variable names used may vary, and the names of all the functions defined or called may vary. Structure and logic of programs to accomplish the functions accomplished by the programs listed above may be arbitrarily varied, without changing the input and output relationship, as is known.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
   for a variable, stored in storage device, accessed at least once in a software-based transactional memory system (STM) defined (STM-defined) critical region of a program, modifying an access to the variable that occurs outside any STM-defined critical region system by
   starting a hardware based transactional memory based transaction;
   within the hardware based transactional memory based transaction, checking if the variable is currently owned by a STM transaction;
   if the variable is not currently owned by a STM transaction, performing the access and then committing the hardware based transactional memory transaction; and if the variable is currently owned by a STM transaction, performing a responsive action.

2. The method of claim 1 wherein the responsive action comprises at least one of:
   raising an exception indicating an error if the variable is currently owned by a STM transaction; and
   waiting for a finite time and then checking if the variable is currently owned by a STM transaction.

3. The method of claim 2 wherein the responsive action comprises raising an exception indicating an error if the variable is currently owned by a STM transaction.

4. The method of claim 2 wherein the responsive action comprises waiting for a finite time and then checking if the variable is currently owned by a STM transaction and then raising an exception if the variable is currently owned by a STM transaction.

5. The method of claim 2 wherein the responsive action comprises repeating the waiting for a finite time and then the checking if the variable is currently owned by a STM transaction until the variable is not currently owned by a STM transaction.

6. The method of claim 1 further comprising raising an exception if a critical event requiring processing by an abort handler of the hardware based transactional memory transaction occurs during the hardware based transactional memory transaction.

7. The method of claim 6 wherein the critical event further comprises an access to an ownership record of the variable, or the variable itself, by a process other than the hardware based transactional memory transaction.

8. The method of claim 1 wherein modifying the access to the variable further comprises at least one of:
   a compiler replacing a load instruction referencing an address that corresponds to the variable with code comprising instructions
      to start a hardware based transactional memory based transaction;
      within the hardware based transactional memory based transaction, to check if the variable is currently owned by a STM transaction; and
      if the variable is not currently owned by a STM transaction, to perform the load instruction referencing the address that corresponds to the variable and then to commit the hardware based transactional memory transaction; and
   a compiler replacing a write instruction referencing an address that corresponds to the variable with code comprising instructions
      to start a hardware based transactional memory based transaction;
      within the hardware based transactional memory based transaction, to check if the variable is currently owned by a STM transaction; and
      if the variable is not currently owned by a STM transaction, to perform the write instruction referencing the address that corresponds to the variable and then to commit the hardware based transactional memory transaction.

9. The method of claim 2, wherein raising an exception further comprises committing the hardware-based transactional memory transaction; and raising a data race exception.

10. The method of claim 6, wherein raising an exception further comprises committing the hardware-based transactional memory transaction; and raising a data race exception.

11. A machine readable medium having stored thereon data that when accessed by a machine causes the machine to perform a method, the method comprising:
    for a variable accessed at least once in a software-based transactional memory system (STM) defined (STM-defined) critical region of a program, modifying an access to the variable that occurs outside any STM-defined critical region system by
    starting a hardware based transactional memory based transaction;

within the hardware based transactional memory based transaction, checking if the variable is currently owned by a STM transaction;

if the variable is not currently owned by a STM transaction, performing the access and then committing the hardware based transactional memory transaction; and if the variable is currently owned by a STM transaction, performing a responsive action.

12. The machine readable medium of claim 11 wherein the responsive action comprises at least one of:

raising an exception indicating an error if the variable is currently owned by a STM transaction; and waiting for a finite time and then checking if the variable is currently owned by a STM transaction.

13. The machine readable medium of claim 12 wherein the responsive action comprises raising an exception indicating an error if the variable is currently owned by a STM transaction.

14. The machine readable medium of claim 12 wherein the responsive action comprises waiting for a finite time and then checking if the variable is currently owned by a STM transaction and then raising an exception if the variable is currently owned by a STM transaction.

15. The machine readable medium of claim 12 wherein the responsive action comprises repeating the waiting for a finite time and then the checking if the variable is currently owned by a STM transaction until the variable is not currently owned by a STM transaction.

16. The machine readable medium of claim 11 wherein the method further comprises raising an exception if a critical event requiring processing by an abort handler of the hardware based transactional memory transaction occurs during the hardware based transactional memory transaction.

17. The machine readable medium of claim 16 wherein the critical event further comprises an access to an ownership record of the variable, or the variable itself, by a process other than the hardware based transactional memory transaction.

18. The machine readable medium of claim 11 wherein modifying the access to the variable further comprises at least one of:

a compiler replacing a load instruction referencing an address that corresponds to the variable with code comprising instructions to start a hardware based transactional memory based transaction;

within the hardware based transactional memory based transaction, to check if the variable is currently owned by a STM transaction; and if the variable is not currently owned by a STM transaction, to perform the load instruction referencing the address that corresponds to the variable and then to commit the hardware based transactional memory transaction; and a compiler replacing a write instruction referencing an address that corresponds to the variable with code comprising instructions to start a hardware based transactional memory based transaction;

within the hardware based transactional memory based transaction, to check if the variable is currently owned by a STM transaction; and if the variable is not currently owned by a STM transaction, to perform the write instruction referencing the address that corresponds to the variable and then to commit the hardware based transactional memory transaction.

19. The machine readable medium of claim 12, wherein raising an exception further comprises committing the hardware-based transactional memory transaction; and raising a data race exception.

20. The machine readable medium of claim 16, wherein raising an exception further comprises committing the hardware-based transactional memory transaction; and raising a data race exception.

21. A system comprising:

a processor to execute programs;

a memory;

a hardware-based transactional memory architecture; and a compiler stored in the memory to modify an access to a variable accessed at least once in a software-based transactional memory system (STM) defined (STM-defined) critical region of a program that occurs outside any STM-defined critical region system by inserting code into the program comprising instructions to start a hardware based transactional memory based transaction;

within the hardware based transactional memory based transaction;

check if the variable is currently owned by a STM transaction; and if the variable is not currently owned by a STM transaction, perform the access and then commit the hardware based transactional memory transaction; and if the variable is currently owned by a STM transaction, performing a responsive action.

22. The system of claim 21 wherein the responsive action comprises at least one of:

raising an exception indicating an error if the variable is currently owned by a STM transaction; and waiting for a finite time and then checking if the variable is currently owned by a STM transaction, raise an exception if at least one of the following conditions is met:

the variable is currently owned by a STM transaction, an access to an ownership record of the variable by a process other than the hardware based transactional memory transaction occurs.

23. The system of claim 21 wherein the compiler is further to do at least one of:

replace a load instruction referencing an address that corresponds to the variable with code comprising instructions to start a hardware based transactional memory based transaction;

within the hardware based transactional memory based transaction, to check if the variable is currently owned by a STM transaction; and if the variable is not currently owned by a STM transaction, to perform the load instruction referencing the address that corresponds to the variable and then to commit the hardware based transactional memory transaction; and to replace a write instruction referencing an address that corresponds to the variable with code comprising instructions to start a hardware based transactional memory based transaction;

within the hardware based transactional memory based transaction, to check if the variable is currently owned by a STM transaction; and if the variable is not currently owned by a STM transaction, to perform the write instruction referencing the address that corresponds to the variable and then to commit the hardware based transactional memory transaction.

24. The system of claim 21 wherein the memory further comprises dynamic random access memory (DRAM).

* * * * *